United States Patent Office 3,084,050
Patented Apr. 2, 1963

3,084,050
SWEET POWDERED COATING FOR
BAKERY PRODUCTS
John B. Holland, Bellevue, Wash., and Verner C. Starner, Milwaukee, Wis., assignors to Richardson & Holland, Inc., Seattle, Wash., a corporation of Washington
No Drawing. Filed July 21, 1961, Ser. No. 125,676
4 Claims. (Cl. 99—141)

This invention relates to improvements in sweet powdered coating for bakery products.

It is common practice to apply a sweet powdered coating to various bakery products, such as doughnuts and the like, for the purpose of enhancing both the appearance and palatability of the same. As the sweet powdered coating is applied to a bakery product while the latter is still warm and fresh, problems have arisen with respect to deterioration of such coating where the bakery product is packaged under modern packaging conditions wherein it is sealed in a farm and moisture-laden condition.

With the foregoing in mind, it is a primary object of the present invention to provide a sweet powdered coating for bakery products which, while enhancing the appearance and palatability of the bakery product to which the coating is applied, will not deteriorate or become soft, sticky and runny under modern product packaging conditions.

A further object of the invention is to provide a sweet powdered coating for bakery products which will remain stable when applied to the bakery goods which, after the application of the coating, are packaged and sealed, and which coating will not be adversely affected by high humidity conditions.

A further object of the invention is to provide a sweet powdered coating for bakery products which will satisfactorily adhere to the product and which will eliminate caking-off of the same when the product is packaged.

A further object of the invention is to provide a sweet powdered coating for bakery products which will absorb fat and moisture from the product, thereby extending the storage life of the latter while in a packaged condition.

A further object of the invention is to provide a sweet powdered coating for bakery products which includes a constituent serving as a color pigment to make the coating on the product whiter and more attractive in appearance.

A further object of the invention is to provide a sweet powdered coating for bakery products which will not unduly dehydrate the product to which it is applied.

With the above and other objects in view, the invention consists of the improved sweet powdered coating for bakery products and its parts, constituents and combinations, as set forth in the claims, and all equivalents thereof.

According to the present invention, it has been found that a superior sweet powdered coating for bakery products results from admixing certain proportions of two types of dextrose hydrates, one of which is quick hydrating. The two types of dextrose should constitute at least 80% of the total, with the proportion of dextrose hydrate being slightly in excess of the proportion of quick hydrating dextrose. In the composition there is also included a relatively small percentage of titanium dioxide which, in the finished composition, improves its adherence to the bakery product and which, furthermore, acts as a color pigment to give the coating an attractive white appearance.

The composition also includes small percentages of starch, shortening and flavoring. The starch produces a smooth appearing product and inhibits grittiness and does not detract from the palatability of the coated bakery product. Any suitable palatable fat may be employed, and it has been found desirable to finely divide the dextroses.

A suitable formula for the improved sweet powdered coating for bakery products is as follows:

| | Percent by weight |
|---|---|
| Ordinary dextrose hydrate | 42.6 |
| Quick hydrating dextrose | 40 |
| Vegetable shortening | 7 |
| Re-dried cornstarch | 10 |
| Purified titanium dioxide | .4 |
| Flavoring | Traces |

It should be understood that the proportions above stated are typical and may be slightly varied to suit various conditions.

In compounding the improved sweet powdered coating for bakery products the two classes of dextroses are blended. Thereafter, the shortening is melted down by being heated to about 150°–175° F. The melted shortening is then sprayed into the mixed dextroses so that the latter are coated and mixed with the fat film. When the shortening has all been sprayed into the dextroses, the corn starch, flavoring materials and titanium dioxide are blended and this mixture is then added to the sugar-fat mixture and the mixing procedure continues to insure blending of all of said ingredients. Because the vegetable shortening or fat is sprayed onto the dextrose crystals to coat the same, the sugar is rendered more insoluble than normally thereby minimizing deterioration which might result from moisture emitted from the coated bakery products after they are packaged, thus insuring a permanent white coating whose quality and stability is enhanced by the titanium dioxide in the composition. The coating retains its powdered form and has excellent adherence characteristics.

As will be obvious to those skilled in the art, various changes and modifications may be made in the composition, and all of such changes are contemplated as may come within the scope of the appended claims.

What is claimed as the invention is:

1. A powdered dusting sugar composition for bakery products including in a dextrose hydrate, edible fat and starch blend, approximately .4% of titanium dioxide, the latter augmenting the appearance and adherence characteristics of the composition, and the dextrose content constituting at least 80% of the total composition and including only a dextrose hydrate and a quick-hydrating dextrose with the former being slightly in excess of the latter.

2. A powdered dusting sugar composition for bakery products including in a dextrose, edible fat and starch blend, approximately .4% of titanium dioxide, the latter augmenting the appearance and adherence characteristics of the composition, and the dextrose content constituting at least 80% by weight of the total and including only a dextrose hydrate and a quick-hydrating dextrose with the former being slightly in excess of the latter.

3. A powdered dusting sugar composition for bakery products including in a dextrose edible fat and starch blend, approximately .4% by weight of the total of titanium dioxide, the dextrose content constituting at least 80% by weight of the total and including a conventional dextrose hydrate and a quick-hydrating dextrose hydrate with the conventional dextrose hydrate being slightly in excess of the quick-hydrating dextrose hydrate.

4. A powdered dusting sugar for edibles, comprising approximately 42.6% by weight of conventional dextrose hydrate, approximately 40% by weight of quick-hydrating dextrose hydrate, approximately 7% by weight of vegetable shortening, approximately 10% by weight of corn starch, approximately .4% by weight of titanium dioxide, and traces of flavoring materials.

References Cited in the file of this patent
UNITED STATES PATENTS
2,739,896    Block et al. _____ Mar. 27, 1956

OTHER REFERENCES

"The Merck Index," seventh edition, published by Merck & Co., Inc., Rahway, N.J., 1960, pages 1048 and 1049.